United States Patent [19]
Hirose et al.

[11] Patent Number: 5,523,358
[45] Date of Patent: Jun. 4, 1996

[54] MODIFIED POLYOLEFIN PARTICLES AND PROCESS FOR PREPARATION THEREOF

[75] Inventors: Toshiyuki Hirose; Hajime Inagaki, both of Yamaguchi-ken; Mamoru Kioka, Iwakuni; Akinori Toyota, Iwakuni; Norio Kashiwa, Iwakuni, all of Japan

[73] Assignee: Mitsui Petrochemical Industries, Ltd., Tokyo, Japan

[21] Appl. No.: 235,419

[22] Filed: Apr. 22, 1994

Related U.S. Application Data

[63] Continuation of Ser. No. 71,227, Jun. 2, 1993, abandoned, which is a continuation of Ser. No. 873,982, Apr. 27, 1992, abandoned, which is a continuation of Ser. No. 439,441, Nov. 21, 1989, abandoned.

[30] Foreign Application Priority Data

| Nov. 21, 1988 | [JP] | Japan | 63-294061 |
| Nov. 21, 1988 | [JP] | Japan | 63-294062 |
| Nov. 21, 1988 | [JP] | Japan | 63-294063 |
| Nov. 21, 1988 | [JP] | Japan | 63-294064 |
| Nov. 21, 1988 | [JP] | Japan | 63-294065 |

[51] Int. Cl.$^6$ ............................ C08J 3/09; C08J 3/11; C08L 23/26

[52] U.S. Cl. ............................ 525/244; 525/242; 525/272; 525/284; 525/285; 525/296; 525/298; 525/301; 525/308; 524/457; 524/502

[58] Field of Search .................... 525/242, 244, 525/282, 284, 285, 296, 298, 301, 308; 524/457, 502

[56] References Cited

U.S. PATENT DOCUMENTS

| 3,414,551 | 12/1968 | Reid et al. | 260/88.2 |
| 3,480,580 | 11/1969 | Joyner et al. | 260/29.6 |
| 3,483,276 | 12/1969 | Mahlman | 260/897 |
| 3,699,186 | 11/1972 | Schrage et al. | 260/836 |
| 3,868,433 | 2/1975 | Bartz et al. | 260/876 R |
| 3,876,609 | 4/1975 | Schrage et al. | 260/42.18 |
| 3,886,227 | 5/1975 | Van Brederode et al. | 260/876 |
| 3,966,845 | 6/1976 | Van Brederode et al. | 260/876 R |
| 4,026,967 | 5/1977 | Flexman, Jr. et al. | 260/878 R |
| 4,048,355 | 9/1977 | Sakayori et al. | 427/375 |
| 4,058,647 | 11/1977 | Inoue et al. | 428/474 |
| 4,087,587 | 5/1978 | Shida et al. | 428/500 |
| 4,117,219 | 9/1978 | Kakogawa et al. | 528/494 |
| 4,198,327 | 4/1980 | Matsumoto et al. | 260/4 |
| 4,230,830 | 10/1980 | Tanney et al. | 525/222 |
| 4,308,084 | 11/1981 | Ohtusuki et al. | 156/233 |
| 4,347,341 | 8/1982 | Bartl et al. | 525/244 |
| 4,536,545 | 8/1985 | Olewer et al. | 525/75 |
| 4,624,992 | 11/1986 | Milani et al. | 525/244 |
| 4,661,549 | 4/1987 | Walker | 525/71 |
| 4,806,581 | 2/1989 | Walker | 525/242 |
| 4,895,909 | 1/1990 | Sypniewski | 525/309 |
| 4,927,888 | 5/1990 | Strait et al. | 525/244 |
| 4,932,980 | 6/1990 | Mueller et al. | 44/62 |
| 5,001,197 | 3/1991 | Hendewerk | 525/285 |

FOREIGN PATENT DOCUMENTS

| 0041214 | 12/1981 | European Pat. Off. | 525/244 |
| 2111393 | 10/1971 | France . | |
| 3011986 | 2/1978 | Japan | 525/244 |
| 964977 | 7/1964 | United Kingdom . | |
| 1335791 | 10/1973 | United Kingdom . | |

*Primary Examiner*—W. Robinson H. Clark
*Attorney, Agent, or Firm*—Sherman and Shalloway

[57] ABSTRACT

A process for preparation of modified polyolefin particles which comprises contacting and reacting (A) 100 wt. parts of polyolefin particles with (B) 0.01 to 50 wt. parts of at least one ethylenic unsaturated compound selected from the group consisting of carboxyl group-containing ethylenic unsaturated compounds or their carboxylic anhydrides or their carboxylic acid derivatives, hydroxyl group-containing ethylenic unsaturated compounds, amino-group-containing ethylenic unsaturated compounds, and glycidyl group-containing ethylenic unsaturated compounds, in the presence of (C) more than 10 wt. parts to not more than 50 wt. parts of a medium of a liquid state at ordinary temperature whose solubility in water at 20° C. is 0.5 wt. % or less and which is capable of swelling the polyolefin, and (D) 0.01 to 10 wt. parts of a radical initiator; and modified polyolefin particles prepared by the aforesaid process.

17 Claims, No Drawings

MODIFIED POLYOLEFIN PARTICLES AND PROCESS FOR PREPARATION THEREOF

This application is a continuation of application Ser. No. 08/071,227, filed Jun. 2, 1993, now abandoned, which is a continuation of 07/873,982, filed Apr. 27, 1992, now abandoned, which is a continuation of 07/439,441, filed Nov. 21, 1989, now abandoned.

This invention relates to modified polyolefin particles and process for preparation thereof. More specifically, this invention relates to polyolefin particles modified by monomers having a certain polar group such as a carboxyl group, and to process for preparation thereof.

Heretofore, methods for modifying a polyolefin by giving it a polar group such as a carboxyl group have been known.

For such modification of polyolefins there have been adopted methods such as a method which comprises compounding a modifier having a polar group and extruding the mixture in a molten state to modify the polyolefin at the high temperature and under the high shearing force (the melting method) and a method which comprises dissolving a polyolefin in a solvent and compounding a modifier in the solution to carry out the modification of the polyolefin (the solvent method).

On the other hand, Japanese Laid-Open Patent Publication No. 77493/1975 discloses a method which comprises contacting a particulate olefin polymer with maleic anhydride in the presence of a radical intiator and in the substantial absence of a liquid medium at a temperature lower than the melting temperature of the olefin to graft-polymerize maleic anhydride to the particulate olefin polymer.

This Laid-Open Patent Publication emphasizes that although when one of various polar monomers is graft-polymerized to a particulate olefin polymer in the substantial absence of a liquid medium, a polymer-adhered film taking in the particulate olefin polymer is formed on the inside wall of the polymerization vessel, such a polymer-adhered film is not formed only when maleic anhydride is used as the polar monomer.

The Laid-Open Patent Publication also discloses, in connection with the graft reaction condition in the substantial absence of a liquid medium, that it is possible to use a small amount of a solvent becoming a gas at a relatively low temperature such as acetone, methyl ethyl ketone, ether or chloroform in order to prevent that maleic anhydride, which readily sublimates, deposits as crystals at the low temperature part of the reactor.

Japanese Laid-Open Patent Publication No. 32722/1980 discloses a method of preparing a modified polyolefin composition having an improved adhesive property by mixing polymer particles of an α-olefin of $C_2$ to $C_{10}$, a polymerizable compound represented by the following formula

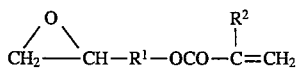

(wherein $R^1$ is a straight-chained lower alkylene group and $R^2$ is H or $CH_3$), and an organic peroxide, and reacting them at a temperature equal to or less than the tacky point of the polymer and under an inert atmosphere. The Laid-Open Patent Publication also discloses that the above organic peroxide to be used is preferably in a liquid state so that good dispersion is obtained in the mixing stage, and that it is thus desirable that the peroxide in a solid state is dissolved in an organic solvent before use. The publication describes as such organic solvents benzene, mineral spirit, toluene, chlorobenzene, dichlorobenzene, acetone, dimethyl phthalate, tertiary butyl alcohol, anisole, decalin and xylene. The publication further discloses that a modified polyolefin composition having a still further increased adhesive property when 1 to 5 wt. parts of the inert solvent is used per 100 wt. parts of the olefin polymer particles in the reaction.

Further, Japanese Laid-Open Patent Publication No. 174309/1982 discloses a gaseous phase graft polymerization method which comprises previously adding a radical polymerization initiator to a polymer having methyl groups, methylene groups and methine groups (excluding polyphenylene oxide) and adding a monomer to be grafted at the graft polymerization temperature and at a pressure equal to or less than the saturated vapor pressure to graft-polymerize the monomer to the polymer. There are exemplified in the publication polyethylene, polypropylene, etc. as the polymer, and maleic anhydride as the monomer. Further, although it is disclosed therein that a solvent which does not inhibit the radical polymerization may be added in an amount of 0 to 10 wt. parts per 100 wt. parts of the polymer, no specific examples of such a solvent is disclosed in the description and examples.

An object of this invention is to provide a process for preparing modified polyolefin particles by grafting an ethylenic unsaturated compound to polyolefin particles.

Another object of the invention is to provide a process for industrially and advantageously preparing modified polyolefin particles by grafting the ethylenic unsaturated compound in a good or high graft efficiency.

A still further object of the invention is to provide a process capable of attaining a high graft efficiency by graft-polymerizing the ethylenic unsaturated compound to the polyolefin particles in a substantially gaseous phase.

A still further object of the invention is to provide a process for preparing modified polyolefin particles in a good or high graft efficiency by carrying out the graft polymerization in the presence of a fairly good amount of a liquid medium having particular properties.

A still further object of the invention is to provide modified polyolefin particles which may be prepared by the above process of the invention, have particular properties and are readily usable for various uses, Still other objects and advantages of the invention will be apparent from the following description.

According to the invention, such objects and advantages of the invention are attained by a process for preparation of modified polyolefin particles which comprises contacting and reacting (A) 100 wt. parts of polyolefin particles with (B) 0.01 to 50 wt. parts of at least one ethylenic unsaturated compound selected from the group consisting of carboxyl group-containing ethylenic unsaturated compounds or their carboxylic anhydrides or their carboxylic acid derivatives, hydroxyl group-containing ethylenic unsaturated compounds, amino-group-containing ethylenic unsaturated compounds, and glycidyl group-containing ethylenic unsaturated compounds, in the precence of (C) more than 10 wt. parts to not more than 50 wt. parts of a medium of a liquid state at ordinary temperature whose solubility in water at 20° C. is 0.5 wt. % or less and which is capable of swelling the polyolefin, and (D) 0.01 to 10 wt. parts of a radical initiator.

The process for preparation of the modified polyolefins of the invention is specifically described.

Polymers referred to in the invention include, unless otherwise noted, both polymers and copolymers.

Polyolefin particles (A) used in the invention have average particle sizes ranging preferably from 10 to 5,000 micrometers, more preferably from 100 to 4,000 micrometers, particularly preferably from 300 to 3,000 micrometers.

Further, polyolefin particles (A) used in the invention are polyolefin particles such that their geometrical standard deviation, which indicates particle size distribution, is in the range of preferably 1.0 to 2.0, more preferably 1.0 to 1.5, particularly preferably 1.0 to 1.3.

Further, polyolefin particles (A) used in the invention are polyolefin particles such that their apparent bulk density by natural drop is in the range of preferably 0.2 g/ml or more, more preferably 0.30 to 0.70 g/ml, particularly preferably 0.35 to 0.60 g/ml.

A polyolefin composing the above polyolefin particles may be obtained by polymerizing or copolymerizing, preferably alpha-olefin(s) having 2 to 20 carbon atoms.

Examples of such alpha-olefins include ethylene, propylene, butene-1, pentene-1, 2-methylbutene-1, 3-methylbutene-1, hexene-1, 3-methylpentene-1, 4-methylpentene-1, 3,3-dimethylbutene-1, heptene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentene-1, decene-1, methylnonene-1, dimethyloctene-1, trimethylheptene-1, ethyloctene-1, methylethylheptene-1, diethylhexene-1, dodecene-1, hexadodecene-1, etc.

It is preferable to use, among them, alphaolefin(s) having 2 to 8 carbon atoms alone or in combination.

There are used in the invention polymer particles which contain a repeating unit derived from the above alpha-olefin(s) in an amount of preferably 50 mole % or more, more preferably 80 mole % or more, still more preferably 90 mole % or more, most preferably 100 mole %.

Examples of other copolymerizable unsaturated nds, which may be used besides the above alpha s in the invention, include chain polyene compounds, cyclic polyene compounds, cyclic monoene compounds, styrene and substituted styrenes. Polyene compounds having two or more of conjugated or non-conjugated olefinic double bonds may preferably be used as such polyene compounds, and include, for example, chain polyene compound such as 1,4-hexadiene, 1,5-hexadiene, 1,7-octadiene, 1,9-decadiene, 2,4,6-octatriene, 1,3,7-octatriene, 1,5,9-decatriene and divinylbenzene; cyclic polyene compounds such as 1,3-cyclopentadiene, 1,3-cyclohexadiene, 5-ethyl-1,3-cyclohexadiene, 1,3-cycloheptadiene, dicyclopentadiene, dicyclohexadiene, 5-ethylidene-2-norbornene, 5-methylene-2-norbornene, 5-vinyl-2-norbornene, 5-isopropylidene-2-norbornene, methylhydroindene, 2,3-diisopropylidene-5-norbornene, 2-ethylidene-3-isopropylidene-5-norbornene and 2-propenyl-2,5-norbornadiene; and the like. Further, there may also be used as such a polyene compound a polyene compound obtained by condensing a cyclopentadiene such as cyclopentadiene with an alpha-olefin such as ethylene, propylene or butene-1 utilizing Diels-Alder reaction.

Further, examples of the cyclic monoene compounds include monocycloalkenes such as cyclopropene, cyclobutene, cyclopentene, cyclohexene, 3-methylcyclohexene, cycloheptene, cyclooctene, cyclodecene, cyclododecene, tetracyclodecene, octacyclodecene and cycloeicosene; bicycloalkenes such as norbornene, 5-methyl-2-norbornene, 5-ethyl-2-norbornene, 5-isobutyl-2-norbornene, 5,6-dimethyl-2-norbornene, 5,5,6-trimethyl-2-norbornene and 2-norbornene; tricycloalkenes such as 2,3,3a,7a-tetrahydro-4,7-methano-1H-indene and 3a,5,6,7a-tetrahydro-4,7-methano-1H-indene; tetracycloalkenes such as 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene and 2,3-dichloro-1,4,5,8-dimethano-1,2,3,4,4a,5,8,8a-octahydronaphthalene; polycycloalkenes such as hexacyclo $[6,6,1,1^{3,6},1^{10,13},0^{2,7},0^{9,14}]$ heptadecene-4, pentacyclo $[8,8,1^{2,9},1^{4,7},1^{11,18},0,0^{3,8},0^{12,17}]$ heneicosene-5 and octacyclo $[8,8,-1^{2,9},1^{4,7},1^{11,18},1^{13,16},0,0^{3,8},0^{12,17}]$ docosene-5; and the like.

There may for example be used as the above styrene and substituted styrenes those represented by the following formula:

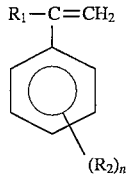

wherein $R_1$ is a hydrogen atom, lower alkyl group having 1 to 5 carbon atoms or halogen atom, and $R_2$ is a hydrogen atom, lower alkyl group having 1 to 5 carbon atoms or vinyl group, and n is an integer of 1 to 5. Specific examples of styrene and the substituted styrenes include styrene, alpha-methylstyrene, vinyltoluene, divinylbenzene, o-chlorostyrene, m-chlorostyrene and p-chlorostyrene.

The above polyolefin particles (A) to be used in the invention may be prepared by the method hereinafter detailedly described.

There may be used in the invention as the ethylenic unsaturated compounds which are grafted to the above polyolefin particles, carboxyl group-containing ethylenic unsaturated compounds or their carboxylic anhydride or their carboxylic acid derivatives, hydroxyl group-containing ethylenic unsaturated compounds, amino group-containing ethylenic unsaturated compounds and glycidyl group-containing ethylenic unsaturated compounds, as previously described. These ethylenic unsaturated compounds may be used alone or in combination of two or more of them.

There may, for example, preferably be used as the carboxyl group-containing ethylenic unsaturated compounds their carboxylic anhydrides and their carboxylic acid derivatives those selected from the group consisting of acrylic acid, methacrylic acid, maleic acid, fumaric acid, tetrahydrophthalic acid, itaconic acid, citraconic acid, crotonic acid and endo-cis-bicyclo [2,2,1] hept-5-ene-2,8-dicarboxylic acid, their caboxylic anhydrides, and acid halides, amides, imides or esters of these carboxylic acids.

Examples of the acid anhydrides, acid halides, amides, imides and esters of the carboxylic acids include maleic chloride, maleimide, maleic anhydride, citraconic anhydride, monomethyl maleate, dimethyl maleate, etc. There may preferably be used among them unsaturated dicarboxylic acids or their acid anhydrides, particularly maleic acid or endo-cis-bicyclo[2,2,1]hept-5-ene-2,8-dicarboxylic acid or their acid anhydrides.

Examples of the hydroxyl group-containing ethylenic unsaturated compounds include hydroxyethyl (meth)acrylate, 2-hydroxypropyl (meth)acrylate, 3-hydroxypropyl (meth)acrylate,2-hydroxy-3-phenoxypropyl(meth)acrylate, 3-chloro-2-hydroxypropyl (meth)acrylate, glycerin mono(meth)acrylate, pentaerythritol mono(meth)acrylate, trimethylolpropane mono(meth)acrylate, tetramethylolethane mono(meth)acrylate, butanediol monometh)acrylate, polyethylene glycol mono(meth)acrylate, 2-(6-hydroxyhexanoyloxy)ethyl acrylate, 10-undecen-1-ol, 1-octen-3-ol, 2-methanolnorbornene, hydroxystyrene, hydroxyethyl vinyl ether, hydroxybutyl vinyl ether, N-methylolacrylamide, 2-(meth)acryloxyethyl acid phosphate, glycerin monoallyl ether, allyl alcohol, allyloxyethanol, 2-butene-1,4-diol, glycerin monoalcohol, etc. It is particularly preferred to use 2-hydroxyethyl (meth)acrylate or 2-hydroxypropyl (meth)acrylate as the hydroxyl group-containing ethylenic unsaturated compound.

There may, for example, preferably be used as the amino group-containing ethylenic unsaturated compounds those having an ethylenic unsaturated double bond and at least one amino group in the molecule represented by the following formula.

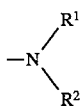

wherein $R^1$ is a hydrogen atom, methyl group or ethyl group, and $R^2$ is a hydrogen atom, alkyl group having 1 to 12 carbon atoms or cycloalkyl group having 6 to 12 carbon atoms. The above alkyl group and cycloalkyl group may have substituent(s), respectively. Examples of these amino group-containing ethylenic unsaturated compounds include aminoethyl acrylate, propylaminoethyl acrylate, dimethylaminoethyl methacrylate, aminopropyl acrylate, phenylaminoethyl methacrylate, cyclohexylaminoethyl methacrylate, methacryloxyethyl acid phosphate monomethanolamine half salt, N-vinyldiethylamine, N-acetylvinylamine, allylamine, methallylamine, N-methylacrylamine, N,N-dimethylacrylamide, N,N-dimethylaminopropylacrylamide, acrylamide N-methylacrylamide, p-aminostyrene, 6-aminohexylsuccinimide, 2-aminoethylsuccinimide, etc. There may particularly preferably be used as the amino group-containing ethylenic unsaturated compounds acrylamine, amionoethyl methacrylate, aminopropyl methacrylate, amino styrene, etc. among the above examples thereof.

There may preferably be used as the glycidyl group-containing ethylenic unsaturated compounds glycidyl ethers such as allyl glycidyl ether, 2-methylallyl glycidyl ether and vinyl glycidyl ether. Allyl glycidyl ether is particularly preferred among them. Such glycidyl ethers have a very high hydrolysis resistance because they have no carboxyl group in the molecule and thus there is no fear that the glycidyl group is eliminated by hydrolysis. Glycidyl esters of conjugated unsaturated dicarboxylic acids or other glycidyl compounds may be used so long as they are used in a small ratio together with such glycidyl ether(s). Examples of such glycidyl esters of conjugated unsaturated dicarboxylic acids include diglycidyl maleate, methyl glycidyl maleate, isopropyl glycidyl maleate, t-butyl glycidyl maleate, diglycidyl fumarate, methyl glycidyl fumarate, isopropyl glycidyl fumarate, diglycidyl itaconate, methyl glycidyl itaconate, isopropyl glycidyl itaconate, diglycidyl 2-methyleneglutarate, methyl glycidyl 2-methyleneglutarate, monoglycidyl ester of butenedicarboxylic acid, etc. Examples of such other glycidyl compounds include 3,4-epoxybutene, 3,4-epoxy-3-methyl-1-butene, vinylcyclohexene monoxide, p-glycidylstyrene, etc. Such glycidyl ester(s) or other glycidyl compound(s) is used desirably in a small ratio of 0.1 mole or less per mole of the glycidyl ether(s).

Liquid media (C) used in the invention are media of a liquid state at ordinary temperature whose solubility in water at 20° C. is 0.5 wt. % or less, preferably 0.4 wt. % or less and which are capable of swelling the polyolefin. Examples of such liquid media (C) include benzene (solubility: 0.09 wt. %), mineral spirit (solubility: 0.00090 wt. %), toluene (solubility: 0.05 wt. %), chlorobenzene (solubility: 0.05 wt. %), o-dichlorobenzene(solubility at 25° C.: 0.01 wt. %), xylene (solubility: 0.02 wt. %), n-hexane (solubility: 0.014 wt. %), n-heptane (solubility: 0.005 wt. %), n-octane (solubility at 25° C.: 0.002 wt. %), carbontetrachloride (solubility: 0.44 wt. %), $ClCH=C=CCl_2$ (solubility: 0.11 wt. %), etc. These solvents may be used alone or in combination in the invention.

According to the process of the invention wherein modified polyolefin particles are prepared in the presence of such a liquid medium (C), it is believed, although the reason is not always clear, that the liquid medium swells the polyolefin particles and as a result the ethylenic unsaturated compound and radical initiator may easily permeate into the polyolefin particles to uniformly modify even the inside of the polyolefin particles with the ethylenic unsaturated compound. Whether the above conjecture is true or not, modified polyolefin particles, which are excellent in granular material characteristics, may be obtained by the invention wherein the graft polymerization is carried out in the presence of liquid medium (C).

There may be used as radical initiator (D) to be used in the invention per se known an organic peroxide, azo compound or the like. Examples of the organic peroxides include dicumyl peroxide, di-tert-butyl peroxide, 2,5-dimethyl-2,5-bis(tert-butylperoxy)hexane, 2,5-dimethyl-2,5-bis(tert-butylperoxy)hexyne-3, 1,3-bis (tert-butylperoxyisopropyl)benzene, 1,1-bis(tert-butylperoxy)- 3,3,5-trimethylcyclohexane, n-butyl 4,4-bis (tert-butylperoxy) valerate, dibenzoyl peroxide, tertbutyl peroxybenzoate, acetyl peroxide, isobutyryl peroxide, octanoyl peroxide, decanoyl peroxide, lauroyl peroxide, 3,5,5-trimethylhexanoyl peroxide, 2,4-dichlorobenzoyl peroxide, m-toluoyl peroxide, etc. Further, there may be used as the azo compounds, azobisisobutyronitrile, etc. Such radical initiators may be used alone or in combination. Dibenzoyl peroxide is particularly preferred among such radical initiators.

The process of the invention is carried out by contacting and reacting the above polyolefin particles (A), ethylenic unsaturated compound (B), liquid medium (C) and radical initiator (D) using, per 100 wt. parts of the polyolefin particles, 0.01 to 50 wt. parts, preferably 0.1 to 40 wt. parts of the ethylenic unsaturated compound, more than 10 wt. parts to not more than 50 wt. parts, preferably 12 to 40 wt. parts of the liquid medium, and 0.01 to 10 wt. parts, preferably 0.05 to 8 wt. parts of the radical initiator.

There is no particular restriction about the method and order of contact of the above components (A), (B), (C) and (D), and the following methods may for example be adopted:
A method which comprises preparing a solution of the ethylenic unsaturated compound and radical initiator in the liquid medium, dispersing the polyolefin particles therein and carrying out the reaction. A method which comprises preparing a solution of the radical initiator in the liquid medium, dispersing the polyolefin particles therein, leading the polyolefin particles to a substantially reactive state, for example, by heating, and thereafter adding the ethylenic unsaturated compound to carry out the reaction. A method which comprises leading the polyolefin particles to a substantially reactive state, for example, by heating, and dispersing the resulting polyolefin particles in a solution of the ethylenic unsaturated compound and radical initiator in the liquid medium to carry out the reaction. A method which comprises dispersing the polyolefin particles in a solution of the radical initiator in the liquid medium, and contacting the dispersion with the ethylenic unsaturated compound in a gaseous state under heating to carry out the reaction.

It is preferred that the contact of the polyolefin particles with the ethylenic unsaturated compound is carried out at a temperature at which the polyolefin particles can substantially hold their shape, namely at a temperature lower than the temperature at which the polyolefin particles begin to mutually fuse. Suitable temperature for the contact is varied depending on the polyolefin particles and radical initiator to be used, but is usually, for example, in the range of 0° to 150° C. In case of the polyolefin particles being, for example, polyolefin particles mainly composed of polypropylene, the temperature of upper limit is about 150° C., in case of polyolefin particles mainly composed of high density polyethylene the upper limit temperature is about 120° C., and in case of polyolefin particles mainly composed of low density polyethylene the upper limit temperature is about 90° C.

The reaction time for modification in the invention may appropriately be determined taking the conditions such as the reaction temperature into account, but is usually 1/60 to 20 hours, preferably 0.5 to 10 hours.

Any apparatus may be used for the above reaction without particular restrictions so long as it is an apparatus capable of mixing and heating of the polyolefin particles, and for example, any reactor of vertical type or horizontal type may be used. Specifically, fluid beds, moving beds, loop reactors, horizontal reactors with agitating blade, rotating drums, vertical reactors with agitating blade, etc. may be used.

Thus, there may be prepared according to the process of the invention modified polyolefin particles of the invention characterized in that (a) their average particle size is in the range of 100 to 5,000 micrometers, (b) their geometrical standard deviation is between 1 and 2, (c) the content of the particles having a particle size of 100 micrometer or less is 20 wt. % or less, and (d) they are modified by polar groups selected from the group consisting of carboxyl groups or their anhydride groups or their derivative groups, hydroxyl groups, amino groups, and glycidyl groups.

The modified polyolefin particles of the invention are those whose average particle size is preferably in the range of 200 to 4,000 micrometers, particularly preferably in the range of 300 to 3,000 micrometers.

Further, the geometrical standard deviation of the modified polyolefin particles of the invention is in the range of preferably 1.0 to 1.5, particularly preferably 1.0 to 1.3. Further, the content of fine particles of 100 micrometer or less is in the range of preferably 0 to 10 wt. %, particularly preferably 0 to 2 wt. %.

Further, the apparent specific gravity of the modified polyolefin particles of the invention is in the range of preferably 0.25 to 0.7, more preferably 0.30 to 0.60 and partuclarly preferably 0.35 to 0.50. Further, the average value of the major axis length/minor axis length ratio of the particles composing the above particle group is in the range of preferably 1.0 to 3.0, more preferably 1.0 to 2.0, and particularly preferably 1.0 to 1.5.

The modified polyolefin particles of the invention have polarity, and thus may advantageously be used, for example, as a raw material of fine particle coatings.

Suitable processes of preparation of the polyolefin particles to be used in the process of the invention are described below.

The polyolefin particles obtained by adopting these processes contain in their ash the transition metals only in an amount of usually 100 ppm or less, preferably 10 ppm or less and particularly preferably 5 ppm or less, and the halogens only in an amount of usually 300 ppm or less, preferably 100 ppm or less and particularly preferably 50 ppm or less.

The polyolefin particles to be used in the invention may be obtained by polymerizing or copolymerizing at least the above alpha-olefin in the presence of a catalyst. The above polymerization reaction or copolymerization reaction may be carried out either in gaseous phase (gaseous phase method) or in liquid phase (liquid phase method).

The polymerization or copolymerization reaction by the liquid phase method is preferably carried out in a suspended state so that the formed polyolefin particles may be obtained in a solid state.

It is desirable in preparation of the polyolefin particles to adopt either of a method wherein the crystalline olefin polymer part and amorphous olefin polymer part are simultaneously formed by supplying two or more kinds of monomers into a reactor, or of a method wherein the synthesis of the crystalline olefin polymer part and the synthesis of the amorphous olefin polymer part are separately and serially carried out using at least two or more of polymerizers. The latter method is preferred from the viewpoint that the molecular weight, composition and amount of the amorphous olefin polymer part may freely be varied.

The most desirable method is a method which comprises synthesizing the crystalline olefin polymer part by gaseous polymerization and then synthesizing the amorphous olefin polymer part by gaseous polymerization, or a method which comprises synthesizing the crystalline olefin polymer part using the monomer as a solvent and then synthesizing the amorphous olefin polymer part by gaseous polymerization.

There may be used as a solvent to be used in this polymerization or copolymerization reaction an inert hydrocarbon or an alpha-olefin as a raw material.

There may usually be used as a catalyst to be used in the above polymerization or copolymerization reaction a catalyst comprising a catalyst component (A) containing a transition metal of the IV A, V A, VI A, VII A or VIII group of the periodic table of elements, and a catalyst component (B) of an organic metal compound containing a metal of the I, II or III group of the periodic table of elements.

As the above catalyst components (A) are preferred catalyst components each containing a transition metal atom of the IV A or V A group of the periodic table of elements, and among them are further preferred catalyst components each containing at least one atom selected from the group consisting of titanium, zirconium, hafnium and vanadium.

Further, other preferred catalyst components (A) include catalyst components each containing a halogen atom and magnesium atom besides the above transition metal atom, and catalyst components each containing a compound wherein a group having a conjugated pi election is coordinated to a transition metal atom of the IV A or V A group of the periodic table.

It is preferred to use as catalyst component (A) in the invention a catalyst which is prepared so that it can exist either per se in a solid state or in a solid state by being carried on a carrier in the reaction system in the above polymerization or copolymerization reaction.

The above catalyst component (A) is further detailedly described taking as an example solid catalyst component (A) which contains the above transition metal, a halogen atom and a magnesium atom.

The average particle size of the above solid catalyst component (A) is in the range of preferably 1 to 200 micrometers, more preferably 5 to 100 micrometers and particularly preferably 10 to 80 micrometers. Further, the geometrical standard deviation (δg) of solid catalyst (A) as a measure for the particle size distribution of solid catalyst (A) is in the range of preferably 1.0 to 3.0, more preferably 1.0 to 2.1 and particularly preferably 1.0 to 1.7.

The average particle size and particle size distribution of catalyst component (A) may be measured as follows by the light transmission method:
The particle size distribution is measured by taking in a cell for measurement a dispersion prepared by adding a catalyst component (A) to a solvent which does not dissolve catalyst component (A) to a concentration (content) of 0.1 to about 0.5 wt. %, preferably 0.1 wt. %, and applying a light and continuously measuring the intensity of the light passing through the liquid in a state wherein the particles are sedimenting. The standard deviation (δg) is determined from the logarithmic normal distribution function based on this particle size distribution. More specifically, the standard deviation (δg) is determined as the ratio ($\theta_{50}/\theta_{16}$) of the average particle size ($\theta_{50}$) to a particle size ($\theta_{16}$) between which and the smallest particle size 16 wt. % of the total particles are contained. In this connection, the average particle size of the catalyst is weight average particle size.

Further, catalyst component (A) has a shape such as, preferably a true spherical, ellipsoidal or granular shape, and the aspect ratio of the particle is preferably 3 or less, more preferably 2 or less, particularly preferably 1.5 or less.

Further, when this catalyst component (A) contains magnesium atom, titanium atom, a halogen atom and an electron donor, the magnesium/titanium ratio (atom ratio) is preferably larger than 1 and is usually in the range of 2 to 50, preferably 6 to 30. Further, the halogen/titanium ratio (atom ratio) is in the range of usually 4 to 100, preferably 6 to 40, and the election donor/titanium ratio (atom ratio) is in the range of usually 0.1 to 10, preferably 0.2 to 6. Further, the specific surface area of this catalyst component (A) is in the range of usually 3 $m^2/g$ or more, preferably 40 $m^2/g$ or more, more preferably 100 to 800 $m^2/g$.

The titanium compound in such a catalyst component (A) is not generally eliminated by a simple procedure such as washing with hexane at ordinary temperature.

Further, catalyst component (A) may contain other atoms or metals besides the above ingredients, or may be diluted with an organic or inorganic diluent. Further, functional group(s) or the like may be introduced into this catalyst component (A).

The above catalyst component (A) may be prepared by adopting, for example, a method which comprises forming a magnesium compound whose average particle size and particle size distribution fall within the above ranges and whose shape is the above-described shape, and then making a preparation of the catalyst, or a method which comprises contacting the magnesium compound in a liquid state with the titanium compound in a liquid state, and then forming a solid catalyst so that it may have the above particle properties.

Such a catalyst component (A) may be used as such. Further, it is also possible to use as catalyst component (A) a catalyst component obtained by carrying on a carrier of uniform shape the magnesium compound, titanium compound and, if necessary, the electron donor. Further, it is also possible to previously prepare a finely powdery catalyst and then granulate it into the above preferred shape.

Such catalyst components (A) are disclosed in Japanese Laid-Open Patent Publications Nos. 135102/1980, 135103/1980, 811/1981 and 67311/1981 and Japanese Patent Applications Nos. 181019/1981 and 21109/1986.

Some examples of processes for preparation of catalyst component (A) are described below:

(1) A solid complex of the magnesium compound and the electron donor having the average particle size of 1 to 200 micrometers and the geometrical standard deviation (δg) of particle size distribution of 3.0 or less is reacted with a liquid titanium halide compound, preferably titanium tetrachloride under the reaction conditions, either after preliminary treatment of the complex with a reaction assistant such as an electron donor and/or an organoaluminum compound or a halogen-containing silicon compound, or without any preliminary treatment.

(2) A liquid magnesium compound having no reducing ability is reacted with a liquid titanium compound preferably in the presence of an electron donor to deposit a solid component whose average particle size is 1 to 200 micrometers and geometrical standard deviation (δg) is 3.0 or less. If necessary, the solid component is further reacted with a liquid titanium compound, preferably titanium tetrachloride, or with a liquid titanium compound and an electron donor.

(3) A liquid magnesium compound having a reacting ability is previously contacted with a reaction assistant capable of making the magnesium compound lose its reducing ability, for example, a polysiloxane or a halogen-containing silicon compound to deposit a solid component having an average particle size of 1 to 200 micrometers and the geometrical standard deviation of particle size distribution (δg) of 3.0 or less. This solid component is then reacted with a liquid titanium compound, preferably titanium tetrachloride, or a titanium compound and an electron donor.

(4) A magnesium compound having a reducing ability is contacted with an inorganic carrier such as silica or an organic carrier. The resulting carrier, after being contacted with a halogen-containing compound or without such a contact, is contacted with a liquid titanium compound, preferably titanium tetrachloride, or with a titanium compound and an electron donor to react the magnesium compound carried on the carrier with the titanium compound and the like.

Such a solid catalyst component (A) has an ability capable of preparing a polymer having a high streoregularity at a high catalyst efficiency. For example, when the homopolymerization of propylene is carried out under the same conditions, the solid catalyst component (A) has an ability capable of preparing a polypropylene having an isotacticity index (insoluble matters in boiling n-heptane) of 92% or more, particularly 96% or more in an amount of usually 3,000 g or more, preferably 5,000 g or more, particularly preferably 10,000 g or more per millimole of titanium.

There are described below examples of magnesium compounds, halogen-containing silicon compounds, titanium compounds and electron donors which may be used for preparation of the above catalyst components (A). Further, aluminium ingredients used for preparation of these catalyst components (A) are compounds exemplified in case of the later-mentioned organometal compound catalyst component (B).

Examples of the magnesium compounds include inorganic magnesium compounds such as magnesium oxide, magnesium hydroxide and hydrotalcite; and organic magnesium compounds such as magnesium carboxylates, alkoxymagnesiums, allyloxymagnesium, alkoxymagnesium halides, allyloxymagnesium halides and magnesium dihalides and further dialkylmagnesiums and diarylmagnesiums.

Examples of the titanium compounds include titanium halides such as titanium tetrachloride; alkoxytitanium halides, allyloxytitanium halides, alkoxytitaniums, allyloxytitanium, etc. Titanium tetrahalides are preferred among them, and titanium tetrachloride is particularly preferred.

Examples of the electron donors include oxygen-containing electron donors such as alcohols, phenols, ketones, aldehydes, carboxylic acids, esters of organic acids or inorganic acids, ethers, acid amides, acid anhydrides, and alkoxysilanes; and nitrogen-containing electron donors such as ammonia, amines, nitriles and isocyanates.

Specific examples of compounds which may be used as such electron donors include alcohols having 1 to 18 carbon atoms such as methanol, ethanol, propanol, pentanol, hexanol, octanol, dodecanol, octadecyl alcohol, oleyl alcohol, benzyl alcohol, phenylethyl alcohol, isopropyl alcohol, cumyl alcohol and isopropylbenzyl alcohol;

phenols having 6 to 20 carbon atoms (these phenols may have lower alkyl group(s) as substituent(s)) such as phenol, cresol, xylenol, ethylphenol, propylphenol, nonylphenol, cumylphenol and naphthol;

ketones having 3 to 15 carbon atoms such as acetone, methyl ethyl ketone, methyl isobutyl ketone, acetophenone, benzophenone and benzoquinone;

aldehydes having 2 to 15 carbon atoms such as acetaldehyde, propionaldehyde, octylaldehyde, benzaldehyde, tolylaldehyde and naphthoaldehyde;

organic acid esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl dichloroacetate, methyl methacrylate, ethyl crotonate, ethyl cyclohexanecarboxylate, methylbenzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, n-butyl maleate, diisobutyl methylmalonate, di-n-hexyl- 1,2-cyclohexane dicarboxylate, diethyl endo-cisbicyclo[2,2,1]hept-5-ene-2,8-dicarboxylate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, phthalide and ethylene carbonate;

acid halides having 2 to 15 carbon atoms such as acetyl chloride, benzoyl chloride, toluyl chloride and anisyl chloride; ethers having 2 to 20 carbon atoms such as methyl ether, ethyl ether, isopropyl ether, butyl ether, amyl ether, tetrahydrofuran and anisole and diphenyl ether; acid amides such as acetamide, benzamide and toluamide;

amines such as methylamine, ethylamine, diethylamine, tributylamine, piperidine, tribenzylamine, aniline, pyridine, picoline and tetramethylenediamine; nitriles such as acetonitrile, benzonitrile and tolunitrile;

orgnophosphorus compounds having the P—O—P bond such as trimethyl phosphite and triethyl phosphite;

alkoxysilanes such as ethyl silicate and diphenyldimethoxysilane; etc.

These electron donors may be used alone or in combination.

Among these electron donors preferred ones are compounds having no active hydrogen, for example, esters of organic acids or inorganic acids, alkoxy (aryloxy) silane compounds, ethers, ketones, tertiary amines, acid nalides and acid anhydrides; further preferred ones are organic acid esters and alkoxy (aryloxy) silane compound; and particuarly preferred ones are esters of aromatic monocarboxylic acids with alcohols having 1 to 8 carbon atoms, esters of dicarboxylic acids such as malonic acid, substituted malonic acids, substituted succinic acids, maleic acid, substituted maleic acids, 1,2-cyclohexanedicarboxylic acid or phthalic acid with alcohols having 2 or more carbon atoms, etc. It may of course be possible to directly add such an electron donor in preparation of the catalyst. Further, it is also possible that the electron donor is not added as a raw material in preparation of catalyst component (A), but, for example a compound capable of being converted to such an electron donor is compounded in the reaction system and the compound is converted to the electron donor in the step of preparation of the catalyst.

The thus prepared catalyst component (A) may be purified by adequate washing with a liquid inert hydrocarbon. Examples of the hydrocarbons which may be used in the washing include aliphatic hydrocarbon compounds such as n-pentane, isopentane, n-hexane, isohexane, n-heptane, n-octane, isooctane, n-decane, n-dodecane, kerosene and liquid paraffin;

alicyclic hydrocarbon compounds such as cyclopentane, methylcyclopentane, cyclohexane and methylcyclohexane; aromatic hydrocarbon compounds such as benzen, toluene, xylene and cymene; and halogenated hydrocarbon compounds such as chlorobenzene and dichloroethane.

These compounds may be used alone or in combination.

There may preferably be used as organometal compound catalyst components (B) organoaluminum compounds having at least one Al-carbon bond in the molecule.

Examples of these organoaluminum compounds include, for example, (i) organoaluminum compounds represented by the formula

$R^1_m Al(OR^2)_n H_p X_q$ (wherein $R^1$ and $R^2$ are hydrocarbon groups having usually 1 to 15, preferably 1 to 4 carbon atoms and may be the same or different with each other, X is a halogen atom, m, n, p and q are numbers of $0 \leq m \leq 3$, $0 \leq n < 3$, $0 \leq p < 3$ and $0 \leq q < 3$ and m+n+p+q=3), and ii) complex alkylated compounds of a metal of the I group of the periodic table and aluminum represented by the formula

$M^1 Al R^1_4$ (wherein $M^1$ is Li, Na or K, and $R^1$ is as defined above).

The following compounds may specifically be included in the organoaluminum compounds of the above formula (i):
Compounds represented by the formula

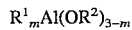

$R^1_m Al(OR^2)_{3-m}$ (wherein $R^1$ and $R^2$ are as defined above, and m is preferably a number of $1.5 \leq m \leq 3$)

Compounds represented by the formula

$R^1_m Al X_{3-m}$ (where $R^1$ is as defined above, X is a halogen, and m is preferably a number of $0 < m < 3$)

Compounds represented by the formula $$R^1{}_m AlH_{3-m}$$

(wherein $R^1$ is as defined above, and m is preferably a number of $2 \leq m < 3$)

Compounds represented by the formula $$R^1{}_m Al(OR^2)_n X_q$$

(wherein $R^1$ and $R^2$ are as defined above, X is a halogen, and m, n and q are numbers of $0 < m \leq 3$, $0 \leq n < 3$ and $0 \leq q < 3$ and $m+n+l=3$).

Specific examples of the organoaluminum compounds represented by the above formula (i) include trialkylaluminums such as triethylaluminum, tributylaluminum and triisopropylaluminum; trialkenylaluminums such as triisoprenylaluminum; dialkylaluminum alkoxides such as diethylaluminum ethoxide and dibutylaluminum butoxide; alkylaluminum sesquialkoxides such as ethylaluminum sesquiethoxide and butylaluminum sesquibutoxide; partially alkoxylated alkylaluminums such as those having the average composition represented by the formula $$R^1{}_{2.5}Al(OR^2)_{0.5};$$

dialkylaluminum halides such as diethylaluminum chloride, dibutylaluminum chloride and diethylaluminum bromide; alkylaluminum sesquihalides such as ethylaluminum sesquichloride, butylaluminum sesquichloride and ethylaluminum sesquibromide;

partially halogenated alkylaluminums, for example alkylaluminum dihalide such as ethylaluminum dichloride, propylaluminum dichloride and butylaluminum dibromide; dialkylaluminum hydrides such as diethylaluminum hydride and dibutylaluminum hydride;

partially hydrogenated alkylaluminums, for example, alkylaluminum dihydrides such as ethylaluminum dihydride and propylaluminum dihydride; and partially alkoxylated and halogenated alkylaluminums such as ethylaluminum ethoxide chloride, butylaluminum butoxide chloride and ethylaluminum ethoxide bromide.

Further, the organoaluminum compounds may be compounds analogous to those represented by the formula (i), for example, organoaluminum compounds wherein two or more of aluminum atoms are linked via an oxygen or nitrogen atom. Specific examples of such compounds include $$(C_2H_5)_2AlOAl(C_2H_5)_2,$$

$$(C_4H_9)_2AlOAl(C_4H_9)_2,$$

$$\underset{\underset{C_6H_5}{|}}{(C_2H_5)_2AlNAl(C_2H_5)_2}$$

Further, exmaples of the organoaluminum compounds represented by the above formula (ii) include $LiAl(C_2H_5)_4$, $LiAl(C_7H_{15})_4$, etc.

It is particularly preferred to use among the above various organoaluminum compounds trialkylaluminums, mixtures of a trialkylaluminum and an alkylaluminum halide, or mixtures of a trialkylaluminum and an aluminum halide.

Further, it is preferred to use an electron donor (C) together with the catalyst component (A) and the organometal compound catalyst component (B).

Examples of usable electron donors (C) include amines, amides, ethers, ketones, nitriles, phosphines, stibines, arsines, phosphamides, esters, thioethers, thioesters, acid anhydrides, acid halides, aldehydes, alcoholates, alkoxy(aryloxy)silanes, organic acids, and amides of metals belonging to the I, II, III or IV group of the periodic table, and acceptable salts of the above compounds. The salt may also be formed in the reaction system by reaction of the organic acid with the organometal compound as catalyst component (B).

There may be mentioned as specific examples of these electron donors compounds previously exemplified as such in catalyst components (A). Particularly preferred electron donors among such electron donors are organic acid esters, alkoxy(aryloxy)silane compounds, ethers, ketones, acid anhydrides, amides, etc. When the electron donor in catalyst component (A) is a monocarboxylic acid ester, an aromatic carboxylic acid alkyl ester is particularly preferred as the electron donor. Further, when the electron donor in catalyst component (A) is an ester of a dicarboxylic acid and an alcohol having 2 or more carbon atoms, an alkoxy(aryloxy)silane compound represented by the formula $$R_n Si(OR^1)_{4-n}$$

(wherein R and $R^1$ are hydrocarbon groups and n is a number of $0 \leq n < 4$) or an amine having a large steric hindrance is preferably used as electron donor (C).

Preferred specific examples of these alkoxy(aryloxy)silane compounds include trimethylmethoxysilane, trimethoxyethoxysilane, dimethyldimethoxysilane, dimethylethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolydimethoxysilane, bis-m-tolyldimethoxysilane, bis-p-tolyldimethoxysilane, bis-p-tolyldiethoxysilane, bis(ethylphenyl)dimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, n-propyltriethoxysilane, decyltrimethoxysilane, decyltriethoxysilane, phenyltrimethoxysilane, gammachloropropyltrimethoxysilane, methyltriethoxysilane, vinyltriethoxysilane, t-butyltriethoxysilane, n-butyltriethoxysilane, isobutyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(betamethoxyethoxy)silane, dimethyltetraethoxydisiloxane, etc. Among them are particularly preferred ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, diphenyldiethoxysilane, ethyl silicate, etc.

Further, as the above amines having a large steric hindrance are particularly preferred 2,2,6,6-tetramethylpyperidine, and 2,2,5,5-tetramethylpyrrolidine, derivatives of these amines, tetramethylmethylenediamine, etc.

Alkoxy(aryloxy)silane compounds are particularly preferred among the above various electron donors used as catalyst components.

Further, there may preferably be used in the above process a catalyst comprising a catalyst component (A) which contains a transition metal atom compound of the IV A or V A group of the periodic table of elements having as ligand(s) group(s) having conjugated pi-electrons, and an organometal compound catalyst component (B).

Examples of the transition metals of the IV A and V A groups of the periodic table include zirconium, titanium, hafnium, chromium, vanadium, etc.

Further, examples of the ligands having groups having conjugated pi-electrons include unsubstituted or alkyl-substituted cyclopentadienyl groups such as cyclopetadienyl, methylcyclopentadienyl, ethylcyclopentadienyl, t-butylcyclopentadienyl, dimethylcyclopentadienyl and pentamethylcyclopentadienyl groups, an indenyl group, an fluorenyl group, etc.

Further, there may be mentioned as preferred examples of the ligands wherein at least two of the above ligands having the cycloalkadienyl skeleton are linked via a lower alkyl group or group containing silicon, phosphorus, oxygen or nitrogen. Examples of such groups include ethylenebisindenyl and isopropyl(cyclopentadienyl-1-fluorenyl) groups, etc.

One or more or preferably two of such ligands having the cycloalkadienyl skeleton are coordinated to the transition metal.

Other ligands than the ligands having the cycloalkadienyl skeleton include hydrocarbon groups having 1 to 12 carbon atoms, alkoxy groups, aryloxy groups, halogens and hydrogen.

There may be exemplified as the hydrocarbon groups having 1 to 12 carbon atoms alkyl groups, cycloalkyl groups, aryl groups, aralkyl groups, etc. Specifically, examples of the alkyl groups include methyl ethyl, propyl, isopropyl and butyl groups, etc., exmaples of the cycloalkyl groups include cyclopentyl and cyclohexyl groups, etc., examples of the aryl groups include phenyl and tolyl groups, etc., and examples of the aralkyl groups include benzyl and neophyl groups, etc.

Examples of the alkoxy groups include methoxy, ethoxy and butoxy groups, etc., the examples of the aryloxy groups include a phenoxy group, etc., and halogens include fluorine, chlorine, bromine and iodine.

Such transition metal compounds containing ligand(s) having the cycloalkadienyl skeleton to be used in the invention are more specifically represented, for example in case of the valence of the transition metal being 4, by the formula $$R^2{}_k R^3{}_l R^4{}_m R^5{}_n M$$

(wherein M is ziroconium, titanium, hafnium, vanadium or the like, $R^2$ is a group having the cycloalkadienyl skeleton, $R^3$, $R^4$ and $R^5$ are groups having the cycloalkadienyl skeleton, alkyl groups, cycloalkyl groups, aryl groups, aralkyl groups, alkoxy groups, aryloxy groups, halogen atoms or hydrogens, k is an integer of one or more, and k, l, m and n are numbers of k+l+m+n=4). Particularly preferred compounds among the compounds of the above formula are those wherein $R^2$ and $R^3$ are groups having the cycloalkadienyl skeleton and the two groups having the cycloalkadienyl skeleton are linked via a group containing silicon, phosphorus, oxygen or nitrogen.

Specific examples of the transition metal compounds wherein M is ziroconium and which contain ligands(s) having the cycloalkadienyl skeleton are indicated below:

bis(cyclopentadienyl)ziroconium monochloride monohydride,
bis(cyclopentadienyl)ziroconium monobromide monohydride,
bis(cyclopentadienyl)methylzirconium hydride,
bis(cyclopentadienyl)ethylzirconium hydride,
bis(cyclopentadienyl)phenylzirconium hydride,
bis(cyclopentadienyl)benzylzirconium hydride,
bis(cyclopentadienyl)neopentylzirconium hydride,
bis(methylcyclopentadienyl)zirconium monochloride hydride,
bis(indenyl)zirconium monochloride monohydride,
bis(cyclopentadienyl)zirconium dichloride,
bis(cyclopentadienyl)zirconium dibromide,
bis(cyclopentadienyl)methylzirconium monochloride,
bis(cyclopentadienyl)ethylzirconium monochloride,
bis(cyclopentadienyl)cyclohexylzirconium monochloride,
bis(cyclopentadienyl)phenylzirconium monochloride,
bis(cyclopentadienyl)benzylzirconium monochloride,
bis(methylcyclopentadienyl)zirconium dichloride,
bis(t-butylcyclopentadienyl)zirconium dichloride,
bis(indenyl)zirconium dichloride,
bis(indenyl)zirconium dibromide,
bis(cyclopentadienyl)zirconiumdimethyl,
bis(cyclopentadienyl)zirconiumdiphenyl,
bis(cyclopentadienyl)zirconiumdibenzyl,
bis(cyclopentadienyl)zirconiummethoxy chloride,
bis(cyclopentadienyl)zirconiumethoxy chloride,
bis(methylcyclopentadienyl)zirconiumethoxy chloride,
bis(cyclopentadienyl)zirconiumphenoxy chloride,
bis(fluorenyl)zirconium dichloride,
ethylenebis(indenyl)diethylzirconium,
ethylenebis(indenyl)diphenylzirconium,
ethylenebis(indenyl)dimethylzirconium,
ethylenebis(indenyl)ethylzirconium monochloride,
ethylenebis(indenyl)zirconium dichloride,
isopropylidenebis(indenyl)zirconium dichloride,
isopropylidine(cyclopentadienyl)-1-fluorenylzirconium chloride,
ethylenebis(indenyl)zirconium dibromide,
ethylenebis(indenyl)zirconiummethoxy monochloride,
ethylenebis(indenyl)zirconiumethoxy monochloride,
ethylenebis(indenyl)zirconiumphenoxy monochloride,
ethylenebis(cyclopentadienyl)zirconium dichloride,
propylenebis(cyclopentadienyl)zirconium dichloride,
ethylenebis(t-butylcyclopentadienyl)zirconium dichloride,
ethylenebis(4,5,6,7-tetrahydro-1-indenyl)dimethylzirconium,
ethylenebis(4,5,6,7-tetrahydro-1-indenyl)methylzirconium monochloride,
ethylenebis(4,5,6,7-tetrahydro-1-indenyl)zirconium dichloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride, ethylenebis(4,7-dimethyl-1-indenyl)zirconium dichloride, ethylene bis(4,7-dimethoxy-1-indenyl)zirconium dichloride.

It is also possible to use transition metal compounds wherein titanium metal, hafnium metal, chromium metal, vanadium metal or the like is substituted for the zirconium in the above zirconium compounds.

It is preferred to use as the organometal compounds catalyst component (B) in the situation an organoaluminum compound obtained either preferably by reaction of an organoaluminum compound with water or by reaction of a solution of an aluminooxane in a solvent such as hydrocarbon with water or an active hydrogen-containing compound.

Such organoaluminum compounds are insoluble or sparingly soluble in benzene at 60° C.

The amount of the catalyst to be used is varied depending on the kind of the used catalyst, etc. For instance, when the above catalyst component (A), organometal compound catalyst component (B) and electron donor (C) are used, the catalyst component (A) is used in an amount within the range of usually 0.001 to 0.5 millimole, preferably 0.005 to 0.5 millimole in terms of the transition metal per liter of the polymerization volume. Further, the organometal compound catalyst (B) is used in an amount such that the amount of the metal atom of the organometal compound catalyst (B) becomes an amount within usually 1 to 10,000 moles, preferably 5 to 500 moles per mole of the transition metal atom of the catalyst component (A) in the polymerization system. Further, when electron donor (C) is used, it is used in an amount within the range of 100 moles or less, preferably 1 to 50 moles, particularly preferably 3 to 20 moles per mole of the transition metal of the catalyst component (A) in the polymerization system.

It is preferred to carry out a preliminary polymerization before the main polymerization using the above catalyst. Such a preliminary polymerization is carried out using as the catalyst prepared by combining at least catalyst component (A) and organometal compound catalyst component (B).

The polymerization amount in the preliminary polymerization is, when titanium is used as the transition metal, usually 1 to 2,000 g, preferably 3 to 1,000 g, particularly preferably 10 to 500 g per gram of the titanium catalyst component.

It is preferred to use an inert hydrocarbon solvent in carrying out the preliminary polymerization. Examples of such inert hydrocarbon solvents include aliphatic hydrocarbons such as propane, butane, n-pentane, i-pentane, n-hexane, i-hexane, n-heptane, n-octane, i-octane, n-decane, n-dodecane and kerosene; alicyclic hydrocarbons such cyclopentane, methylcyclopentane, cyclohexane and methylcyclohexane; aromatic hydrocarbones such as benzene, toluene and xylene; and halogenated hydrocarbons such as methylene chloride, ethyl chloride, ethylene chloride and chlorobenzene. Among these inert hydrocarbon solvents aliphatic hydrocarbons are preferred and aliphatic hydrocarbons having 4 to 10 carbon atoms are particularly preferred. Further, it is also possible to use as the solvent the monomer to be used in the reaction.

Suitable examples of alpha-olefin to be used in this preliminary polymerization include alpha-olefin having 10 or less carbon atoms such as ethylene, propylene, 1-butene, 1-pentene, 4-methyl-1-pentene, 3-methyl-1-pentene, 1-heptene, 1-octene and 1-decene, and alpha-olefines having 3 to 6 carbon atoms are further preferred and propylene is particularly preferred. These alpha-olefins may be used either alone, or in combination of two or more of them so long as a crystalline polymer is prepared.

The polymerization temperature in the preliminary polymerization is varied depending on the alpha-olefin to be used and use of the inert solvent and cannot unconditionally be determined, but the temperature is in the range of generally −40° to 80° C., preferably −20° to 40° C. particularly preferably −10° to 30° C. For example, the temperature is arranged in the range of −40° to 70° C. in case of propylene being used as the alpha-olefin, −40 to 40° C. in case of 1-butene being used, or −40° to 70° C. in case of 3-methyl-1-pentene being used. It is also possible to make hydrogen gas coexist in the reaction system of this preliminary polymerization.

Polyolefin particles may be prepared by carrying out a polymerization reaction (main polymerization) introducing the above monomer in the reaction system, either after the preliminary polymerization was carried out in the above manner or without carrying out preliminary polymerization.

The monomer to be used in the main polymerization may be identical to or different from the monomer used in the preliminary polymerization.

The polymerization temperature in main polymerization of the olefin is in the range of usually −50° to 200° C., preferably 0° to 150° C. The polymerization pressure is in the range of usually atmospheric pressure to 100 kg/cm$^2$, preferably atmospheric pressure to 50 kg/cm$^2$. The polymerization reaction may be carried out by any of the batch, semi-continuous and continuous methods.

The molecular weight of the olefin polymer to be obtained may be adjusted by hydrogen and/or the polymerization temperature.

In the invention, the thus obtained polyolefin particles are usually then used as such for the modification reaction without subjecting the particles to a pulverization or granulation step.

The present invention is further described by the following examples, but the invention should not be limited therto.

EXAMPLES 1 to 10

(a) Preparation of catalyst component (A)

After a high speed stirring apparatus having an inner volume of 21 (made by Tokushu Kika Kogyo Co.) was throughly nitrogen-purged, 700 ml of purified kerosene, 10 g of commercially available MgCl$_2$, 24.2 g of ethanol and 3 g of Emazol 320 (trade name of sorbitan distearate made by Kao-Atlas Co., Ltd.) were placed therein, and the system was heated with stirring and stirred at 120° C. and 800 rpm for 30 minutes. The mixture was transferred, with high speed stirring using a Teflon tube having an inner diameter of 5 mm, to a 2-liter glass flask (with a stirrer) previously containing 11 of purified kerosene cooled to −10° C. The resulting solid was collected by filtration, and washed thoroughly with hexane to obtain a carrier.

7.5 g of the carrier was suspended in 150 ml of titanium tetrachloride at tom temperature, 1.3 ml of diisobutyl phthalate was added, and the system was heated to 120° C. After stirring and mixing at 120° C. for 2 hours, the solid part was collected by filtration and resuspended in 150 ml of titanium tetrachloride, and stirring and mixing at 130° C. for 2 hours were carried out again. The reaction solid was collected from the reaction mixture by filtration and washed with an adequate amount of purified hexane to obtain a solid catalyst component (A). The component contained in terms of atom 2.2 wt. % of titanium, 63 wt. % of chlorine and 20 wt. % of magnesium, and 5.5 wt. % of diisobutyl phthalate. A true spherical catalyst was obtained whose average particle size was 64 micrometers and geometrical standard deviation (δg) of particle size distribution is 1.5.

(b) Preliminary polymerization

The following preliminary polymerization was carried out on the catalyst component (A).

200 ml of purified hexane was placed in a 400-ml glass reactor which had been nitrogen-purged, and then 20 mmol of triethylaluminum, 4 mmol of diphenyldimethoxysilane and 2 mmol, in terms of titanium atom, of the above Ti catalyst component (A) were placed therein. Propylene was then supplied at a speed of 5.9 Nl/hour over a period of one hour, whereby 2.8 g of propylene was polymerized per gram of the Ti catalyst component (A). After the preliminary polymerization, the liquid part was removed by filtration and the separated solid part was resuspended in decane.

(c) Polymerization (I) Homopolymerization (1)

5 kg of propylene was placed in a 17-1 polymerizer at room temperature and heated, and then 8 mmol of triethylaluminum, 8 mmol of diphenyldimethoxysilane and 0.08 mmol, in terms of titanium atom, of the preliminary polymerization-treated catalyst component (A) were added thereto at 50° C. The temperature inside the polymerizer was maintained at 70° C. for 2 hours, and then the remaining propylene was purged to recover a polymer. The obtained polymer had [η] of 6.97 dl/g and an apparent bulk density of 0.45 g/ml, and the yield was 3.1 kg.

Further, the average particle size of the polymer was 1.8 mm and the geometrical standard deviation thereof was 1.3, and the content of fine particles having a particle size of 100 micrometers or less contained in the polymer was 0.1 wt. %.

Homopolymerization (2)

The same procedure as in homopolymerization (1) was carried out except that 1.5N liters of hydrogen was added after the addition of 5 kg of prop twenty minutes was adopted. 3.3 kg of a polymer having [η] of 3.5 dl/g and an apparent bulk density of 0.46 g/ml was obtained.

Further, the average particle size of the polymer was 1.7 mm and the geometrical standard deviation thereof was 1.3, and the content of fine particles of 100 micrometers or less contained in the polymer was 0.2 wt. %.

(II) Copolymer 2.5 kg of propylene and 20N liters of hydrogen were placed in a 17-1 polymerizer at room temperature and heated, and 15 mmol of triethylaluminum, 1.5 mmol of diphenyldimethoxysilane and 0.05 mmol in terms of titanium atom of the preliminary polymerization-treated catalyst component (A) were added at 50° C., and the temperature inside the polymerizer was maintained at 70° C. 14 minutes after the temperature had reached 70° C., the vent valve was opened and the propylene was purged until the pressure of the inside of the polymerizer became atmospheric pressure. After the purge, a copolymerization was carried out. Namely, ethylene, propylene and hydrogen were supplied to the polymerizer at velocities of 480 Nl/hr, 720 Nl/hr and 12 Nl/hr, respectively. Vent opening was adjusted so that the pressure of the inside of the polymerizer became 10 kg/cm$^2$.G. The temperature during the copolymerization was maintained at 70° C. After 60 minutes of polymerization time, the inside of the polymerizer was depressurized to obtain 3.2 kg of a polymer. MI of the polymer at 230° C. under a load of 2 kg was 10 g/10 min., the ethylene content thereof was 25 mol % and the apparent bulk density thereof was 0.42 g/ml. Further, the content of the components soluble in n-decane at 23° C. in the polymer was 25 wt. %, and the ethylene content of the soluble components was 50 mol %.

Further, the average particle size of the obtained polymer was 1.9 mm, the geometrical standard deviation thereof was 1.3, and the content of fine particles of 100 micrometers or less container in the polymer was 0.0 wt. %.

(d) 100 wt. parts of the polypropylene (PP)

Indicated in Table 1 was charged in a stainless autoclave equipped with an agitating blade having a spiral type dobble ribbon, and the inside of the autoclave was thoroughly nitrogen-purged. A solution consisting of maleic anhydride (MAH), benzoyl peroxide (BPO) and the solvent in the mutual ratio indicated in Table 1 was dropwise added to the polypropylene over a period of 10 minutes while the polypropylene was stirred at room temperature, and thereafter the mixture was further stirred at room temperature for additional 30 minutes.

Then, the temperature of the system was raised to 100° C. and the reaction was carried out for 4 hours.

The polymer after the reaction was dissolved in p-xylene of 130° C., the solution was allowed to cool, and the polymer was deposited with acetone, whereby the polymer became free of the unreacted matter and thus was purified.

The results are shown in Table 1.

TABLE 1

|  |  | Exam. 1 | Exam. 2 | Exam. 3 | Exam. 4 | Exam. 5 | Exam. 6 | Exam. 7 | Exam. 8 | Exam. 9 | Exam. 10 |
|---|---|---|---|---|---|---|---|---|---|---|---|
|  |  |  |  | Compounding condition |  |  |  |  |  |  |  |
| PP (wt. part) | Homopolymerization (1) | 100 |  |  |  |  |  |  |  |  |  |
|  | Homopolymerization (2) |  | 100 | 100 | 100 | 100 | 100 | 100 |  |  |  |
|  | Copolymerization |  |  |  |  |  |  |  | 100 | 100 | 100 |
| MAH (wt. part) |  | 2.27 | 2.27 | 2.27 | 4.57 | 0.5 | 2.27 | 2.27 | 2.27 | 2.27 | 1.15 |
| BPO (wt. part) |  | 0.172 | 0.172 | 0.4 | 0.172 | 0.25 | 0.172 | 0.172 | 0.056 | 0.172 | 0.085 |
| Solvent (wt. part) | Toluene | 17.4 | 17.4 | 17.4 | 17.4 | 17.4 |  |  | 17.4 | 17.4 | 17.4 |
|  | Chlorobenzene |  |  |  |  |  | 17.4 |  |  |  |  |
|  | Acetone |  |  |  |  |  |  | 15.8 |  |  |  |
|  |  |  |  | modified polyolefin particles |  |  |  |  |  |  |  |
| Graft amount (wt. %) |  | 0.26 | 0.20 | 0.38 | 0.13 | 0.35 | 0.22 | 0.07 | 0.15 | 0.52 | 0.39 |
| Graft efficiency (%) |  | 11 | 8.8 | 17 | 2.8 | 70 | 10 | 3.1 | 6.6 | 23 | 34 |
| MFR 230° C., 2160 g (g/10 min.) |  | 0.18 | 0.99 | 2.2 | 0.65 | 3.2 | 0.86 | 0.99 | 5.1 | 5.0 | 5.0 |
| Average particle size (mm) |  | 1.8 | 1.7 | 1.7 | 1.7 | 1.7 | 1.7 | 1.7 | 1.9 | 1.9 | 1.9 |

TABLE 1-continued

|  | Exam. 1 | Exam. 2 | Exam. 3 | Exam. 4 | Exam. 5 | Exam. 6 | Exam. 7 | Exam. 8 | Exam. 9 | Exam. 10 |
|---|---|---|---|---|---|---|---|---|---|---|
| Geometrical standard deviation | 1.3 | 1.3 | 1.3 | 1.3 | 1.3 | 1.3 | 1.3 | 1.3 | 1.3 | 1.3 |
| Content of fine particles of 100 micrometers or less (wt. %) | 0.1 | 0.2 | 0.2 | 0.2 | 0.2 | 0.2 | 0.2 | 0.0 | 0.0 | 0.0 |
| Apparent bulk density (g/ml) | 0.45 | 0.46 | 0.46 | 0.46 | 0.46 | 0.46 | 0.46 | 0.42 | 0.42 | 0.42 |

COMPARATIVE EXAMPLE 1

100 wt. parts of polypropylene (homocopolymer (2), 2.27 wt. parts of MAH and 0.17 wt. parts of 2,5-dimethyl-2,5-di(t-butylperoxy)hexyne-3 (made by Nippon Yushi Co., Ltd.) were mixed in Henschel mixer, supplied to a biaxial extruder (made by Plastic Kagaku Co., Ltd., PLABOR 40L/D-40 set to 200° C., and molten and kneaded. The graft amount of the thus obtained modified product was 0.18 wt. % and MFR thereof was 30.

EXAMPLES 11 TO 13

(a) Polymerization (I) Homopolymer 5 kg of propylene was added to a 17-1 polymerizer at room temperature, followed by addition of 1.51 of hydrogen. The mixture was heated, and at 50° C. were added 8 mmol of triethylaluminum, 8 mmol of diphenyldimethoxysilane and 0.08 mmol in terms of titanium atom of the preliminary polymerization-treated catalyst component (A) obtained in (b) of Example 1. The inside of the polymerizer was maintained at 70° C. for one hour and 20 minutes. The remaining propylene was then purged and the polymer was collected. The polymer had [η] of 3.5 dl/g and an apparent bulk density of 0.46 g/ml, and the yield thereof was 3.3 kg (b) 100 wt. parts of the polypropylene (PP) indicated in Table 2 was charged into a stainless autoclave equipped with an agitating blade having a spiral type double ribbon, and the inside of the system was throughly nitrogen-purged. A solution consisting of allyl glycidyl ether, benzonyl peroxide (BPO) and toluene in the mutual ratio descirbed in Table 2 was dropwise added to the polypropylene over a period of 10 minutes while the polypropylene was stirred at room temperature, and after the dropwise addition the mixture was further stirred at room temperature for additional 30 minutes.

Thereafter, the temperature of the inside of the system was raised to 100° C., and the reaction was carried out for 4 hours.

The polymer after the reaction was dissolved in p-xylene of 130° C., and after natural cooling of the mixture deposited with acetone, whereby the unreacted matters were removed to purify the polymer.

TABLE 2

|  | Exam. 11 | Exam. 12 | Exam. 13 |
|---|---|---|---|
| Homopolymer (2) (wt. part) | 100 | 100 | 100 |
| Monomer (kind) Allyl Glycidyl ether (wt. parts) | 1.0 | 2.5 | 5.0 |
| BPO (wt. parts) | 0.4 | 0.17 | 0.17 |
| Toluene (wt. parts) | 17.4 | 17.4 | 17.4 |
| Graft amount (wt. parts) | 0.51 | 0.20 | 0.18 |
| Graft efficiency (%) | 51 | 8 | 3.6 |

TABLE 2-continued

|  | Exam. 11 | Exam. 12 | Exam. 13 |
|---|---|---|---|
| MFR 230° C., 2160 g (g/10 min.) | 0.81 | 0.99 | 0.96 |
| Characteristics of the modified polyolefin particles |  |  |  |
| Average particle size (mm) | 1.7 | 1.7 | 1.7 |
| Geometrical standard deviation | 1.3 | 1.3 | 1.3 |
| Content of fine particles of 100 micrometers or less (wt. %) | 0.2 | 0.2 | 0.2 |
| Apparent bulk density (g/ml) | 0.46 | 0.46 | 0.46 |

EXAMPLES 14 TO 16

The monomer, benzoyl peroxide (BPO) and toluene in the respective amounts indicated in Table 3 were added to 100 wt. parts of the copolymer obtained in (c) of Example 1, followed by mixing at room temperature. 10 g of this mixture was weighed and placed in a test tube having a diameter of 25 mm, cooled with liquid nitrogen to freeze it. Then, the inside of the system was nitrogen-purged, the temperture of the system was brought back to room temperature, the test tube was placed in an oil bath of 100° C., and the reaction was carried out for 4 hours.

The polyolefin particles after the reaction was dissolved in p-xylene at 130° C., and after allowing the mixture to cool, was deposited with methanol to carry out a purification.

The graft amount was determined by IR using the previously prepared calibration curve.

TABLE 3

|  | Exam. 14 | Exam. 15 | Exam. 16 |
|---|---|---|---|
| Copolymer (wt. part) | 100 | 100 | 100 |
| Monomer (kind) | HEMA 1) | HEA 2) | HPA 3) |
| (wt. part) | 3.03 | 2.71 | 3.03 |
| BPO (wt. part) | 0.17 | 0.17 | 0.17 |
| Toluene (wt. parts) | 17.4 | 17.4 | 17.4 |
| Graft amount (wt. parts) | 0.23 | 0.27 | 0.22 |
| Graft efficiency (%) | 7.6 | 10 | 7.3 |
| MFR 230° C., 2160 g (g/10 min.) | 10.1 | 7.2 | 7.2 |
| Characteristics of the modified polyolefin particles |  |  |  |
| Average particle size (mm) | 1.9 | 1.9 | 1.9 |
| Geometrical standard deviation | 1.3 | 1.3 | 1.3 |
| Content of fine particles of 100 micrometers or less | 0.0 | 0.0 | 0.0 |

TABLE 3-continued

| | Exam. 14 | Exam. 15 | Exam. 16 |
|---|---|---|---|
| (wt. %) | | | |
| Apparent bulk density (g/ml) | 0.42 | 0.42 | 0.42 |

1) HEMA: 2-hydroxyethyl methacrylate
2) HEA: 2-hydroxyethyl acrylate
3) HPA: 2-hydroxypropyl acrylate

EXAMPLE 17

300 g of the homopolymer (2) obtained by (c) of Example 1 was charged in a 1-1 glass reactor equipped with a spiral type double ribbon agitating blade and a dropping funnel, and the inside of the system was thoroughly nitrogen-purged. Then, a solution consisting of 52 g of toluene, 9.1 g of N,N-dimethylamino methacrylate and 0.51 g of BPO was placed in the dropping funnel. The solution was dropwise added to the PP at room temperature for 10 minutes while the latter was stirred, and the mixture was further stirred at that temperature for additional 30 minutes. The temperature inside the system was then raised to 100° C. and the reaction was carried out for 4 hours.

After the reaction, the polyolefin particles were dissolved in xylene of 130° C., and after allowing the solution to cool, deposited with acetone to carry out the purification thereof. Measurement of graft amount of the particles revealed that 0.25 wt. % of N,N-dimethylamino methacrylate was grafted. MFR of the graft polymer was 1.1 g/10 minutes.

The average particle size of these modified polyolefin particles was 1.7 mm and the geometrical standard deviation thereof was 1.3, and the content of fine particles of 100 micrometers or less contained in this polymer was 0.2 wt. %.

We claim:

1. A process for preparation of modified polyolefin particles which comprises contacting and reacting (A) and (B) defined below under a nitrogen atmosphere in (C) a non-aqueous liquid medium selected from the group consisting of toluene and xylene, and in the presence of (D) a radical initiator, (A) 100 wt. parts of polyolefin particles which contain a repeating unit derived from an alpha-olefin in an amount of at least 50 mole % and having an average particle size in the range of between 100 to 5000 micrometers, with (B) 0.01 to 50 wt. parts of at least one ethylenic unsaturated compound selected from the group consisting of carboxyl group-containing ethylenic unsaturated compounds or their carboxylic anhydrides or the acid halide, amide, imide or ester derivatives thereof, hydroxyl group-containing ethylenic unsaturated compounds, amino-group-containing ethylenic unsaturated compounds, and glycidyl group-containing ethylenic unsaturated compounds, wherein the amount of said liquid medium (C) is more than 10 wt. parts to not more than 50 wt. parts and the amount of said radical initiator (D) is 0.01 to 10 wt. parts.

2. The process of claim 1 wherein the polyolefin particles are composed of a homopolymer or copolymer of an alpha-olefin having 2 to 20 carbon atoms.

3. The process of claim 1 wherein the ethylenic unsaturated compounds are carboxyl group-containing ethylenic unsaturated compounds or their carboxylic anhydrides selected from the group consisting of acrylic acid, methacrylic acid, maleic acid, fumaric acid, tetrahydrophthalic acid, itaconic acid, citraconic acid, crotonic acid and endocis-bicyclo[2.2.1]hept-5-ene-2,8-dicarboxylic acid, their carboxylic anhydrides, or acid halides, amides, imides or esters of these carboxylic acids.

4. The process of claim 1 wherein the ethylenic unsaturated compounds are hydroxyl group-containing ethylenic unsaturated compounds selected from the group consisting of hydroxyethyl (meth)acrylate, 2-hydroxypropyl-(meth)acrylate, 3-hydroxypropyl (meth)acrylate, 2-hydroxy-3-phenoxypropyl (meth)acrylate, 3-chloro-2-hydroxypropyl (meth)acrylate, glycerin mono(meth)acrylate, pentaerythritol mono(meth)acrylate, trimethylolpropane mono(meth)acrylate, tetramethylolethane mono(meth)acrylate, butanediol mono(meth)acrylate, polyethylene glycol mono(meth)acrylate, 2-(6-hydroxyhexanoyloxy)ethyl acrylate, 10-undecen-1-ol, 1-octen-3-ol, 2-methanol-norbornene, hydroxystyrene, hydroxyethyl vinyl ether, hydroxybutyl vinyl ether, N-methylolacrylamide, 2-(meth)acryloyloxyethyl acid phosphate, glycerin monoallyl ether, allyl alcohol, allyloxyethanol, 2-butene- 1,4-diol and glycerin monoalcohol.

5. The process of claim 1 wherein the ethylenic unsaturated compounds are amino group-containing ethylenic unsaturated compounds having in the molecule an ethylenic unsaturated double bond and at least one amino group represented by the following formula

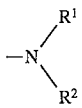

wherein $R^1$ is a hydrogen atom, methyl goup or ethyl group, and $R^2$ is a hydrogen atom, alkyl group having 1 to 12 carbon atoms or cycloalkyl group having 6 to 12 carbon atoms.

6. The process of claim 1 wherein the amino group-containing ethylenic unsaturated compounds are selected from the group consisting of aminoethyl acrylate, propylaminoethyl acrylate, dimethylaminoethyl methacrylate, aminopropyl acrylate, phenylamino ethyl methacrylate, cyclohexylaminoethyl methacrylate, methacryloyloxyethyl acid phosphate monomethanolamine half salt, N-vinyldiethylamine, N-acetylvinylamine, allylamine, methallylamine, N-methylacrylamine, N,N-dimethylacrylamide, N,N-dimethylaminopropylamide, acrylamide, N-methylacrylamide, p-aminostyrene, 6-aminohexylsuccinimide and 2-aminoethylsuccinimide.

7. The process of claim 1 wherein the glycidyl group-containing ethylenic unsaturated compounds are selected from the group consisting of allyl glycidyl ether, 2-methylallyl glycidyl ether and vinyl glycidyl ether.

8. The process of claim 1 wherein the contact and reaction are carried out at a temperature at which the polyolefin particles do not fuse with one another and the used radical initiator decomposes.

9. The process of claim 8 wherein the contact and reaction are carried out at a temperature between 0° to 150° C.

10. The process of claim 1 wherein the polyolefin particles have an average particle size in the range of 300 to 3,000 micrometers.

11. The process of claim 1 wherein the polyolefin particles have an apparent bulk density determined by natural drop in the range of 0.35–0.60 g/ml.

12. The process of claim 2 wherein the alpha-olefin has 2 to 8 carbon atoms.

13. The process of claim 1 comprising contacting and reacting (A) 100 wt. parts of polyolefin particles with 0.1 to 40 wt. parts of the ethylenic unsaturated compound, (C) more than 12 wt. parts to not more than 40 wt. parts of said liquid medium, and (D) 0.05 to 8 wt. parts of the radical initiator.

14. The process of claim 1 wherein at least 80 mole % of the repeating units of the polyolefin particles are derived from alpha-olefins having from 2 to 8 carbon atoms.

15. The process of claim 1 wherein the polyolefin particles are comprised of a homopolymer of an alpha-olefin having from 2 to 8 carbon atoms.

16. The process of claim 1, wherein the liquid medium (C) is toluene.

17. The process of claim 1, wherein the liquid medium (C) is p-xylene.

* * * * *